(12) United States Patent
Ito

(10) Patent No.: US 8,516,359 B2
(45) Date of Patent: Aug. 20, 2013

(54) SPECIFYING A WEB ADDRESS IN ORDER TO PROVIDE DUMMY DATA TO BE TEMPORARILY INSERTED IN A DOCUMENT AND LATER REPLACING THE DUMMY DATA

(75) Inventor: Hiroyasu Ito, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 102 days.

(21) Appl. No.: 13/298,652

(22) Filed: Nov. 17, 2011

(65) Prior Publication Data

US 2012/0137208 A1    May 31, 2012

(30) Foreign Application Priority Data

Nov. 26, 2010    (JP) .................. 2010-263156

(51) Int. Cl.
*G06F 17/00* (2006.01)
(52) U.S. Cl.
USPC .................... 715/205; 358/1.15; 358/1.18
(58) Field of Classification Search
None
See application file for complete search history.

(56) References Cited

U.S. PATENT DOCUMENTS

| | | |
|---|---|---|
| 2005/0259292 A1 | 11/2005 | Tokimoto et al. |
| 2007/0297672 A1* | 12/2007 | Eschbach et al. ............ 382/173 |
| 2009/0259731 A1* | 10/2009 | Luk et al. ..................... 709/219 |
| 2009/0296133 A1 | 12/2009 | Kawabushi |
| 2009/0296146 A1* | 12/2009 | Nakawaki ................... 358/1.15 |

FOREIGN PATENT DOCUMENTS

| | | |
|---|---|---|
| EP | 1143695 A2 | 10/2001 |
| JP | 2000-137705 A | 5/2000 |
| JP | 2005-094523 A | 4/2005 |
| JP | 2005-333477 A | 12/2005 |
| JP | 2006-165712 | 6/2006 |
| JP | 2007-221824 | 8/2007 |
| JP | 2008-099202 | 4/2008 |
| JP | 2009-157470 | 7/2009 |

OTHER PUBLICATIONS

Extended European Search Report issued in European Patent Application No. 11190491.8 (corresponding to Japanese Patent Application No. 2010-263156, dated Mar. 6, 2012.

* cited by examiner

*Primary Examiner* — Stephen Hong
*Assistant Examiner* — Asher Kells
(74) *Attorney, Agent, or Firm* — Buchanan Ingersoll & Rooney PC

(57) ABSTRACT

A document creation system including a document creation apparatus and an image processing apparatus, the document creation apparatus including a requesting portion which requests the image processing apparatus to provide dummy data to be temporarily inserted into the document, and the image processing apparatus including an address analyzer; a dummy data generator which generates dummy data; a transmitter which transmits to the document creation apparatus, the generated dummy data; a job administrator which generates and stores a reserved job about the request; a target data generator which generates target data to be inserted into the document; and a replacing portion which publishes at the specified Web address the target data generated by the target data generator, by replacing the dummy data exiting at the specified Web address with it.

20 Claims, 11 Drawing Sheets

Scheme of an URL

| http:// | The sign of the start of a Web address |
|---|---|
| mfp001 | The name of a host |
| DummyData | 1st Directory: an instruction to generate dummy data |
| username01 | 2nd Directory: the account name of a registered user of the MFP (this part may be omitted) |
| filename.jpg | The name of a file to be generated (may include a specified file format) |

FIG.6

Scheme of a file

| Resolution | Resolution_xxxdpi | "Xxx" is a specified dpi value of resolution |
|---|---|---|
| Size | Size_XXxYYmm | "XX" and "YY" are specified millimeter values of horizontal and vertical lengths of the image |
| Pixel Count | Dot_XXxYYpixels | "XX" and "YY" are specified numbers of horizontal and vertical pixels of the image |
| Color Mode | | |
| | Color | Scan Mode:"Color" |
| | ACS | Scan Mode:"ACS" |
| | Mono | Scan Mode:"Mono" |

FIG.7

Dummy
User01/No.1
2010/03/24
300 × 400Pixel   400dpi

| Please select a reserved scan job from the list below. | | | |
|---|---|---|---|
| Date of Registration | Size | Resolution | Color Mode |
| 2010/3/19 13:33 | 400 × 300pixels | 200dpi | Color |
| 2010/3/19 13:35 | 200 × 300pixels | 200dpi | Monochrome |
| 2010/3/19 13:36 | 360 × 300pixels | 200dpi | Color |
| 2010/3/19 13:39 | 400 × 300pixels | 200dpi | Color |
| | | | |

SPECIFYING A WEB ADDRESS IN ORDER TO PROVIDE DUMMY DATA TO BE TEMPORARILY INSERTED IN A DOCUMENT AND LATER REPLACING THE DUMMY DATA

This application claims priority under 35 U.S.C. §119 to Japanese Patent Application No. 2010-263156 filed on Nov. 26, 2010, the entire disclosure of which is incorporated herein by reference in its entirety.

BACKGROUND OF THE INVENTION

1. Field of the Invention

The present invention relates to: a document creation system in which an image processing apparatus and a document creation apparatus are connected to each other via a network; a document creation method for the document creation system; an image processing apparatus preferably employed in the document creation system; and a recording medium.

2. Description of the Related Art

The following description sets forth the inventor's knowledge of related art and problems therein and should not be construed as an admission of knowledge in the prior art.

Generally, a base document is prepared on a personal computer, image data is read out from another document by a scanner of an image processing apparatus such as the one described above, and the image data is incorporated to the base document to make it into a target document.

On the other hand, having being widely used for recent years is a technology to create a document with use of a document creation application running on a Web server (as known as cloud computing), which does not limit the user to use a certain terminal neither limit data to be physically stored on personal computers which are supposed to be exposed to a substantial risk of data leakage.

Generally, in a document creation procedure using a personal computer: a base document is constructed; necessary images are obtained as electronic data by a scanner or the like then laid out on the base document to make it into a target document; and the target document is outputted, for example it is printed or transmitted via facsimile. To insert the necessary images at certain positions of the base document, the links to the URLs (Uniform Resource Locators), i.e. Web addresses from which the necessary images (the locations where the necessary images are physically stored) can be obtained, are required.

However, in this case where a document is created with use of a document creation application running on a Web server, it is obvious that no URLs are known yet before reading out the necessary images from the base document. More specifically, it is necessary to incorporate image data existing on the Web to the base document because a document creation application running on a Web server works on the basis of HTTP; however no image data is physically stored at any URLs before obtaining it from the base document.

To prevent such inconvenience: the user moves to the side of an image processing apparatus leaving his/her personal computer; operates the image processing apparatus to have a document read by the scanner; uploads image data obtained from the document so as to keep it temporarily on a public space on the Web; returns to the side of his/her personal computer; and operates the personal computer to specify the URL of the public space where the image data having just been uploaded with use of the document creation application. After that, a target document is finally obtained.

Meanwhile, in Japanese Unexamined Patent Publication JP 2000-137705, there disclosed an image data processing apparatus facilitating document creation by putting image data read out from a document by a scanner on a Web page and transmitting a notice of the URL of the Web page.

Furthermore, in Japanese Unexamined Patent Publication JP 2005-094523, there disclosed a network facsimile system being configured to register an HTML link to an image on a server and transmit it to a target address so as to allow accessing the image in a simple manner.

Furthermore, in Japanese Unexamined Patent Publication JP 2005-333477, there disclosed a data processing apparatus being configured to: receive document data with a user's created link information via a network; picks the link information from the document data; read out image data from a document by a scanner; and put the image data onto the document data which is obtained from to the link information.

However, what is found with these cited prior arts is the same problem of less operational efficiency because the user is still required to go back and forth to operate his/her personal computer and the image processing apparatus in the method previously mentioned where the user moves to the side of an image processing apparatus leaving his/her personal computer; operates the image processing apparatus to have a document read by the scanner; uploads image data obtained from the document so as to keep it temporarily on a public space on the Web; returns to the side of his/her personal computer; and operates the personal computer to specify the URL of the public space where the image data having just been uploaded with use of the document creation application.

Briefly, the technologies disclosed in Japanese Unexamined Patent Publications No. JP 2000-137705, 2005-094523, and JP 2005-333477 do not substantially resolve the problem that no image data to be incorporated to a base document can be physically stored at any locations before obtaining it from the base document and neither the problem of the troublesome procedure until obtaining a target document.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention relates to a document creation system comprising a document creation apparatus creating a document with Web-accessible data being inserted into a certain area thereof and an image processing apparatus publishing the Web-accessible data at a Web address, being connected to each other via a network, the document creation apparatus comprising a requesting portion which requests, before generation of target data, the image processing apparatus to provide dummy data to be temporarily inserted into the document as an alternative for target data, by specifying a Web address inside of the image processing apparatus, and the image processing apparatus comprising:
an address analyzer which analyzes the specified Web address to determine whether or not the request of the document creation apparatus is a request for dummy data;
a dummy data generator which generates dummy data if it is recognized as a request for dummy data by the address analyzer;

a transmitter which transmits to the document creation apparatus, the generated dummy data in a form allowing the dummy data to be temporarily inserted from the specified Web address;

a job administrator which generates and stores a reserved job about the request if it is recognized as a request for dummy data by the address analyzer;

a target data generator which generates target data to be inserted into the document by performing an operation of data generation when the user gives an instruction to start the reserved job generated and stored by the job administrator; and a replacing portion which publishes at the specified Web address the target data generated by the target data generator, by replacing the dummy data exiting at the specified Web address with it.

In a second aspect, the present invention relates to a document creation method for a document creation apparatus creating a document with Web-accessible data being inserted into a certain area thereof and an image processing apparatus publishing the Web-accessible data at a Web address, being connected to each other via a network, comprising:

the document creation apparatus's requesting, before generation of target data, the image processing apparatus to provide dummy data to be temporarily inserted into the document as an alternative for target data, by specifying a Web address inside of the image processing apparatus, and the image processing apparatus's:

analyzing the specified Web address to determine whether or not the request of the document creation apparatus is a request for dummy data;

generating dummy data if it is recognized as a request for dummy data;

transmitting to the document creation apparatus, the generated dummy data in a form allowing the dummy data to be temporarily inserted from the specified Web address;

generating and storing a reserved job about the request if it is recognized as a request for dummy data;

generating target data to be inserted into the document by performing an operation of data generation when the user gives an instruction to start the reserved job generated and stored; and publishing the generated target data at the specified Web address by replacing the dummy data existing at the specified Web address with it.

In a third aspect, the present invention relates to an image processing apparatus comprising:

an address analyzer which analyzes a Web address inside of the image processing apparatus to determine whether or not a request of an external device, which is issued before generation of target data by specifying the Web address, is a request for dummy data to be inserted into a document as an alternative for target data;

a dummy data generator which generates dummy data to be temporarily inserted from the specified Web address if it is recognized as a request for dummy data by the address analyzer;

a transmitter which transmits to the external device, the generated dummy data in a form allowing the dummy data to be temporarily inserted from the specified Web address;

a job administrator which generates and stores a reserved job about the request if it is recognized as a request for dummy data by the address analyzer;

a target data generator which generates target data to be inserted into the document by performing an operation of data generation when the user gives an instruction to start the reserved job generated and stored by the job administrator; and a replacing portion which publishes at the specified Web address the target data generated by the target data generator, by replacing the dummy data existing at the specified Web address with it.

In a fourth aspect, the present invention relates to a non-transitory computer-readable recording medium with an executable document creation program being stored thereon to make a computer of an image processing apparatus execute:

analyzing a Web address inside of the image processing apparatus to determine whether or not a request of an external device, which is issued before generation of target data by specifying the Web address, is a request for dummy data to be inserted into a document as an alternative for target data;

generating dummy data to be temporarily inserted from the specified Web address if it is recognized as a request for dummy data;

transmitting to the external device, the generated dummy data in a form allowing the dummy data to be temporarily inserted from the specified Web address;

generating and storing a reserved job about the request if it is recognized as a request for dummy data;

generating target data to be inserted into the document by performing an operation of data generation when the user gives an instruction to start the reserved job generated and stored; and publishing the generated target data at the specified Web address by replacing the dummy data existing at the specified Web address with it.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a table representing a scheme of a Web address;

FIG. 7 is a table representing a scheme of a file (data);

FIG. 11 is a view illustrating an example of dummy data;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying drawings.

Figure 1:
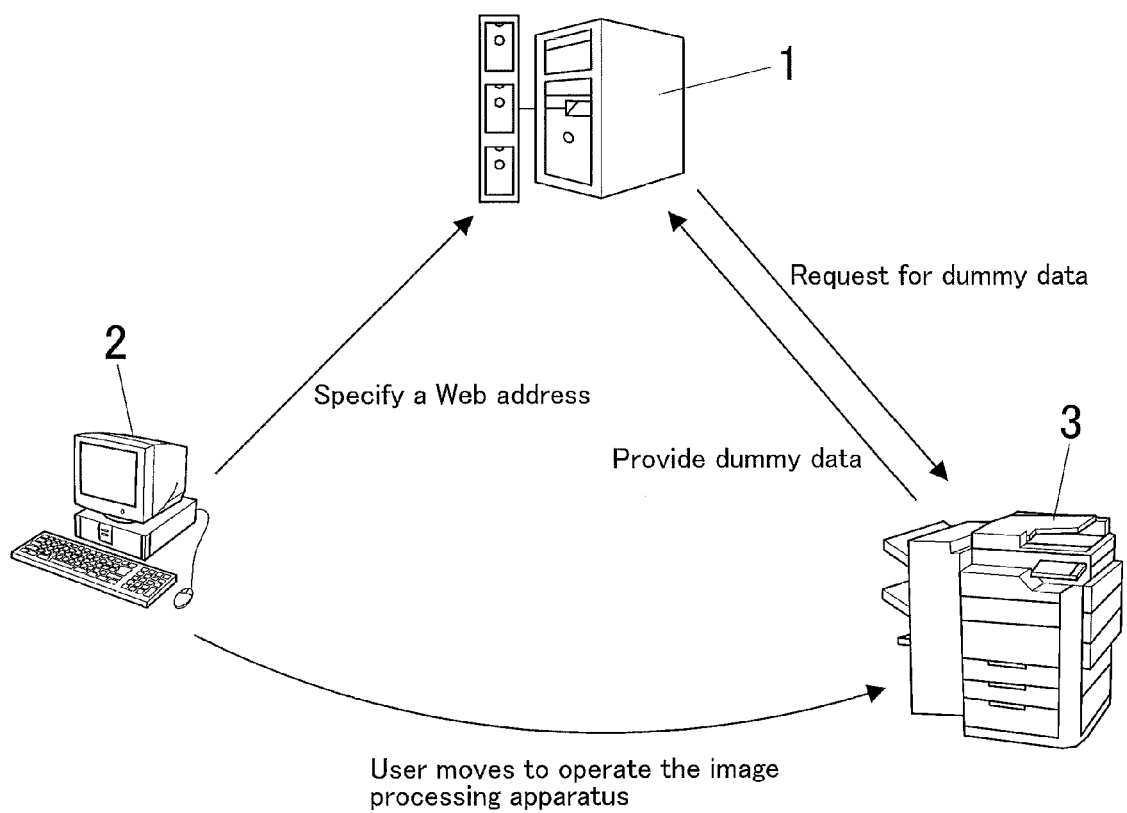
FIG. 1 is a view illustrating a configuration of a document creation system according to one mode of implementing the present invention.

FIG. 1 is a view illustrating a configuration of a document creation system according to one mode of implementing the present invention.

The document creation system of FIG. 1 is provided with an application server 1, a user terminal 2, and an image processing apparatus 3, which are connected to each other via a network.

The application server 1 is a server with a document creation application running on the Web, being installed thereon. In this mode of implementation, the application server 1 serves as a document creation apparatus which creates a document according to an instruction from the user terminal 2. The application server 1 is composed of a server computer; a CPU thereof, which is not illustrated in this Figure, performs all operations according to an operation program stored on a program storage. A good example of such a document creation application should be Google Docs, for example.

The user terminal 2 is composed of a personal computer; the user accesses the application server 1 to create a document with use of a document creation application installed on the application server 1, by operating the user terminal 2. In this mode of implementation, as illustrated in a browser screen of FIG. 2, which is displayed when a document is created, a document D including an image read out by the image processing apparatus 3 is laid out in Area D1 indicated by the shadow lines.

In this mode of implementation, the image processing apparatus 3, as which a MFP, a multifunctional digital machine is employed as described above, has a copier function, a scanner function, a facsimile function, a printer function, a memory function, and the like. The image processing apparatus 3 also will be referred to as MFP 3 hereinafter.

Figure 3:
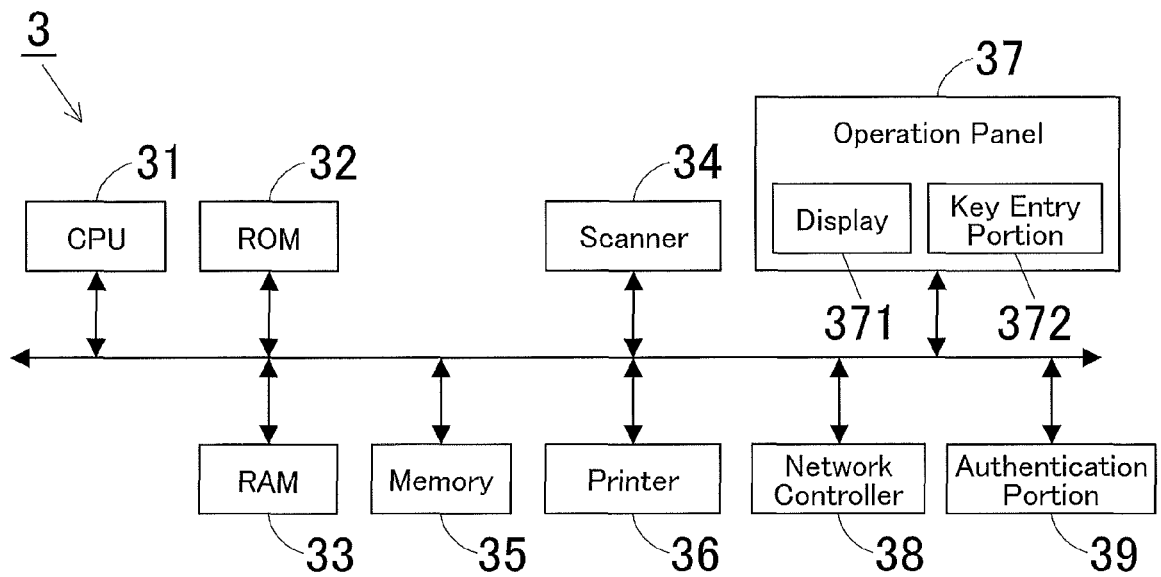
FIG. 3 is a block diagram illustrating a configuration of an image processing apparatus employed in the document creation system of FIG. 1.

FIG. 3 is a block diagram illustrating a configuration of the image processing apparatus 3.

The image processing apparatus 3 is provided with a CPU 31, a ROM 32, a RAM 33, a scanner 34, a memory 35, a printer 36, an operation panel 37, a network controller 38, an authentication portion 39, and the like.

The CPU 31 integrally controls the image processing apparatus 3 to allow it to use its basic functions such as a copier function, a printer function, a scanner function, a facsimile function, and the like. Specifically, in this mode of implementation, when the application server 1 accesses the image processing apparatus 3 to obtain dummy data at a specified Web address inside of the image processing apparatus 3, the CPU 31 of the image processing apparatus 3 analyzes the specified Web address and judges whether or not it is a request for dummy data; if it is a request for dummy data, the CPU 31 further generates dummy data and a reserved job accordingly. These operations later will be described in detail.

The ROM 32 is a memory which stores an operation program and the like for the CPU 31.

The RAM 33 provides a work area for the CPU 31 to execute processing according to an operation program.

The scanner 34 is a reading device which reads images on a document placed on a document table (not illustrated in this Figure) to obtain image data, electronic data from the document.

The memory 35 is composed of a nonvolatile recording device such as a HDD; image data read out from a document by the scanner 34, a reserved job generated by the CPU 31, and other various data objects are stored on the memory 35.

The printer 36 prints out image data read out from a document by the scanner 34, print data received from the user terminal 2, and the like according to a specified mode.

The operation panel 37, which is used for various entry operations, is provided with: a display 371 composed of a liquid crystal display panel with touch-panel functionality, displaying messages, operation screens, and the like; and a key entry portion 372 including numeric keys, a Start key, a Stop key, and the like.

The network controller 38 transmits and receives data by controlling communications with the application server 1, the user terminal 2, and the like on the network.

The authentication portion 39 performs user authentication to judge whether or not the user who tries to log on the image processing apparatus 3 has the right of using the image processing apparatus 3.

Figure 4:
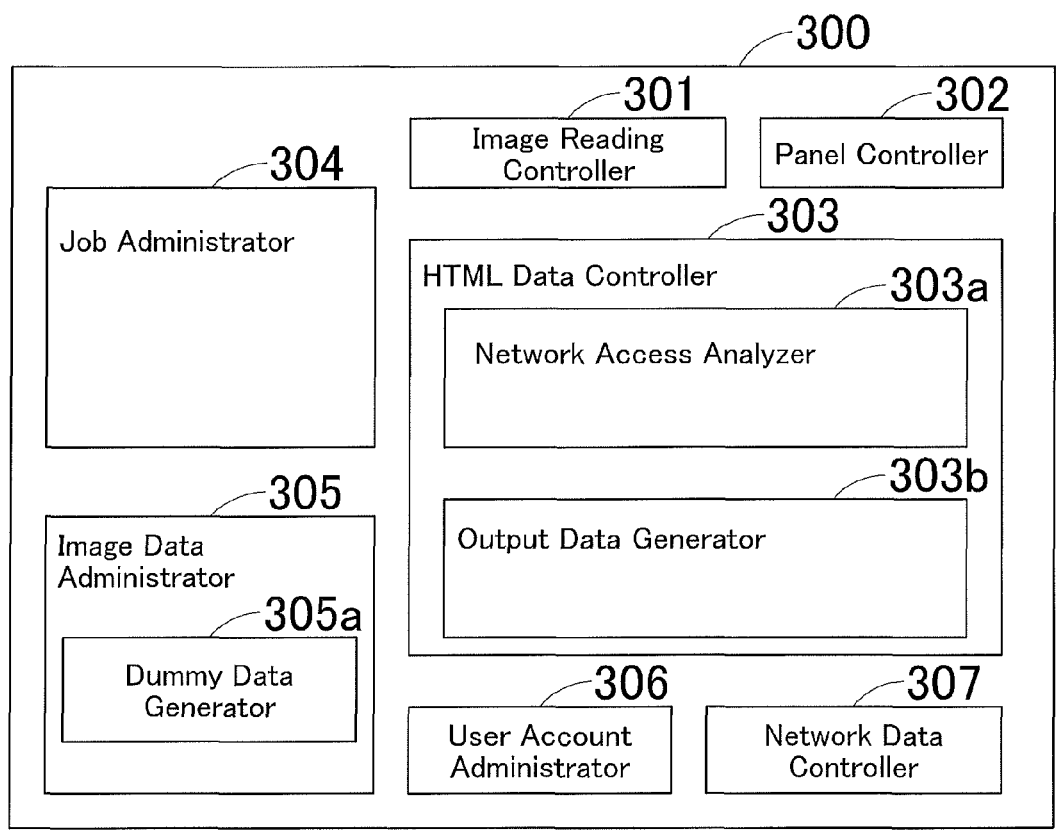
FIG. 4 is a block diagram illustrating a functional configuration of a controller of the image processing apparatus.

Composed of the CPU 31, the ROM 32, the RAM 33, and the like is a controller 300 of the image processing apparatus 3; FIG. 4 is a block diagram illustrating a functional configuration of the controller 300.

The controller 300 is provided with an image reading controller 301, a panel controller 302, an HTML data controller 303, a job administrator 304, an image data administrator 305, a user account administrator 306, a network data controller 307, and the like.

The image reading controller 301 controls the operations of the scanner 34; the panel controller 302 controls the entry operations via the operation panel 37 and the display operations of the operation panel 37.

The HTML data controller 303, which is provided with a network access analyzer 303*a* and an output data generator 303*b*, performs image processing on data in HTML (HyperText Markup Language).

When an external device such as the application server 1 accesses the image processing apparatus 3 according to a specified Web address, the network access analyzer 303*a* analyzes the specified Web address to judge whether or not it is a request for dummy data. The output data generator 303*b* generates HTML data to be outputted to the network.

The job administrator 304 serves to store the status of jobs; when the application server 1 accesses the image processing apparatus 3 to obtain dummy data, in this mode of implementation, the job storage 304 generates a reserved job and stores it on itself.

The image data administrator 305, which includes a dummy data generator 305a, generates image data and stores it on itself.

The user account administrator 306 serves to manage user accounts; the network data controller 307 controls network data which is not HTML data.

The following is the overview of the operations of the document creation system of FIG. 1.

Figure 2:
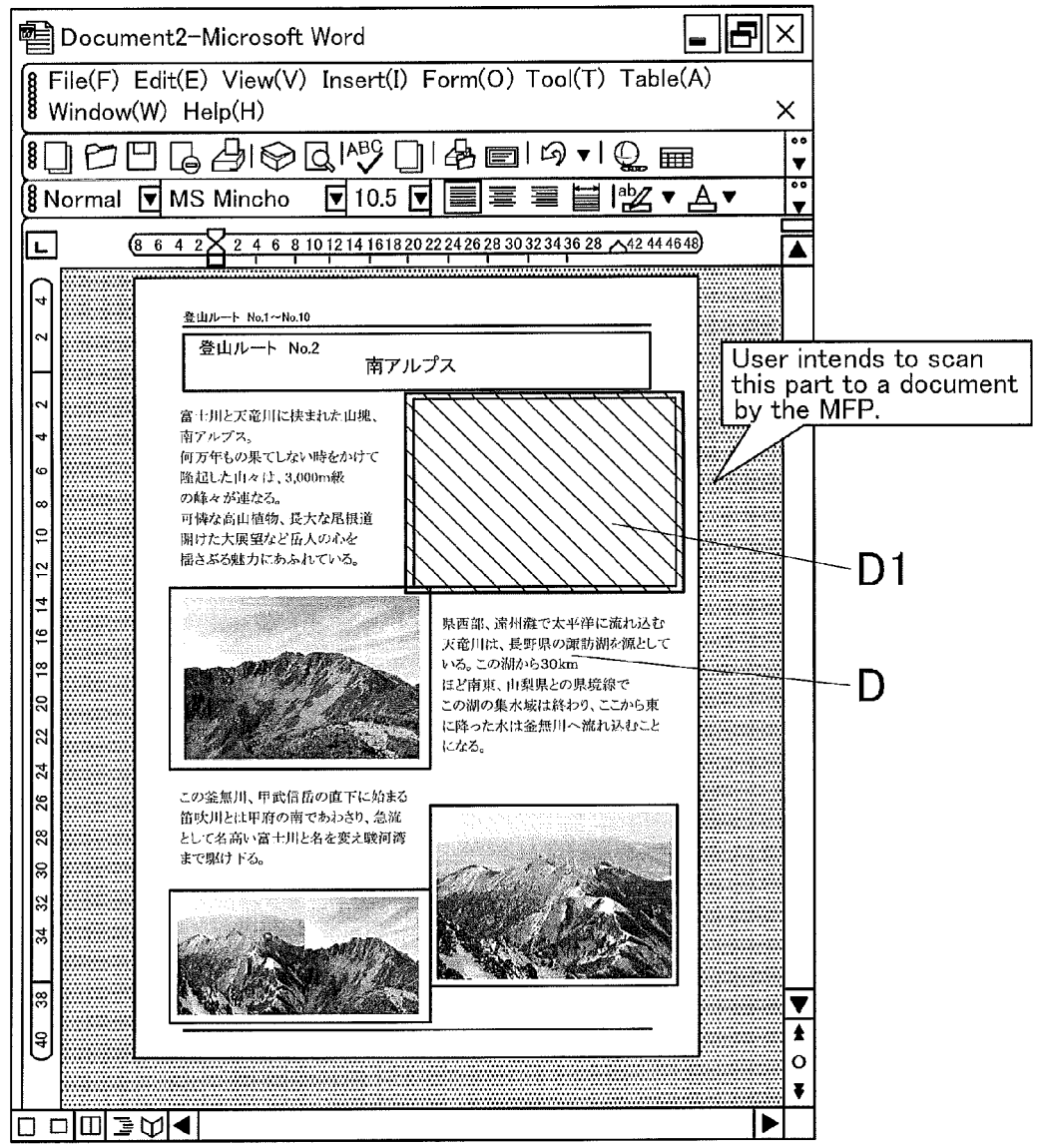
FIG. 2 is a view illustrating a browser screen which is displayed on a user's terminal when the user is creating a document.

The user creates a base document on the Web with use of a document creation application installed on the application server 1, by operating his/her own user terminal 2. Subsequently, as illustrated in FIG. 2, the user creates on the base document a frame (Area D1) in which image data can be inserted.

In the conventional practices, the user moves to the side of the image processing apparatus 3 to have a document read by the scanner 34 and give a Web address (URL) to the obtained image data so that it can be searched by the Web address. Subsequently, the user returns to the side of his/her own user terminal 2, and by operating the user terminal 2, accesses the image processing apparatus 3 to obtain the URL of the target image data. And the user successfully finishes creating a target document by putting the URL of the target image data in Area D1 of the base document that the user is currently editing.

To the contrary, in the document creation system according to the mode of implementation as illustrated in FIG. 1, the user: creates on a base document a frame (Area D1) in which image data can be inserted; temporarily specifies the size of another document to be read by the scanner 34 of the image processing apparatus 3, the reading mode of the scanner 34, and the like; and further specifies a Web address (URL) inside of the image processing apparatus 3 as the link to the dummy data to be inserted as an alternative image (the locations where the dummy data is stored), according to rules determined in advance. The Web address inside of the image processing server 3 should include the user's specified size of the document, reading mode, and the like. And the user successfully finishes creating a target document by putting the Web address in Area D1 of the base document that the user is currently editing.

The application server 1 accesses the image processing apparatus 3 to obtain the image data (dummy data) at the Web address inside of the image processing apparatus 3.

Hereinafter, the operations of the image processing apparatus 3 will be further described with the FIGS. 5 to 9. This processing routine is executed by the CPU 31 of the image processing apparatus 3 according to an operation program stored on a recording medium such as the ROM 32 of the image processing apparatus 3.

Figure 5:
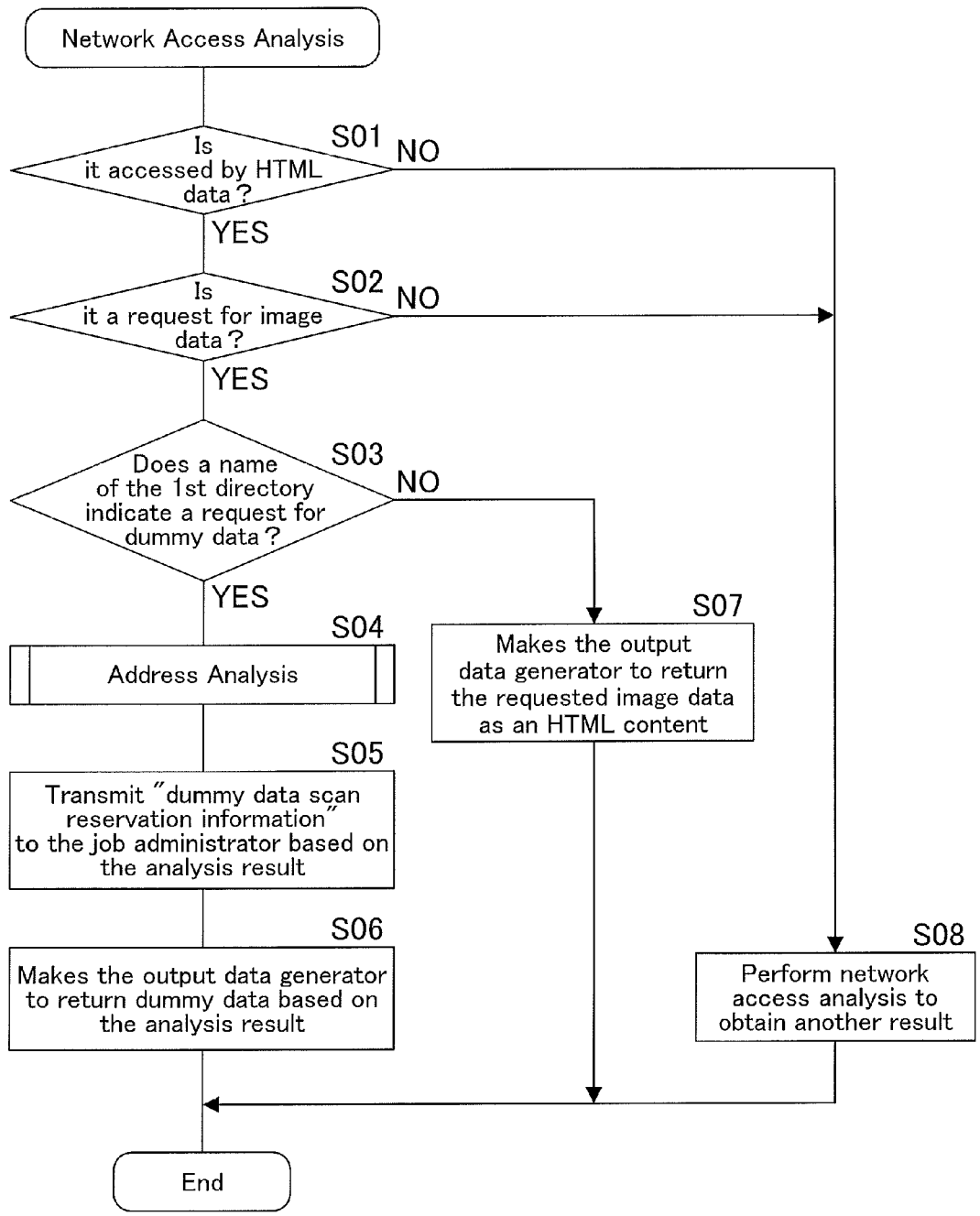
FIG. 5 is a flowchart representing the operation of network access analysis.

Being accessed by the application server 1, the image processing apparatus 3 performs network access analysis by the network access analyzer 303a as illustrated in FIG. 5.

In Step S01 of FIG. 5, it is judged whether or not the image processing apparatus 3 is accessed by HTML data. If it is not accessed by HTML data (NO in Step S01), network access analysis is performed again to obtain another result in Step S08. The network access analysis in Step S08 will not be further described in the specification.

If the image processing apparatus 3 is accessed by HTML data (YES in Step S01), then it is judged in Step S02 whether or not it is a request for image data. Whether or not it is a request for image data may be judged for example depending on the command or the like received when the image processing apparatus 3 is accessed.

If it is not a request for image data (NO in Step S02), the processing routine proceeds to Step S08, in which network access analysis is performed to obtain yet another result. If it is a request for image data (YES in Step S02), then it is judged in Step S03 whether or not it is a request for dummy data. More specifically, in Step S03, it is judged whether or not the name of the first directory (folder) included in the specified Web address (URL) is any of the names having been determined in advance for dummy data storages.

If it is any of the names having been determined in advance (YES in Step S03), then it is definitely a request for dummy data; the processing routine proceeds to Step S04, in which address analysis is performed. The operation of address analysis later will be described in detail. Then, dummy data scan reservation information is transmitted to the job administrator 304 based on the result of address analysis in Step S05, and an instruction to output dummy data is given to the output data generator 303b based on the result of address analysis in Step S06.

As described above, it is recognized as a request for dummy image as long as the name of the first directory included in the specified Web address is any of those having been determined in advance, which eliminates the inconvenience that and dummy data and target data are created all for nothing every time the image processing apparatus 3 is accessed by the application server 1.

In Step S03, if the name of the first directory included in the specified Web address (URL) is not any of those having been determined in advance and exclusive for dummy data storages (NO in Step S03), the processing routine proceeds to Step S07, in which an instruction is given to the output data generator 303b so that the output data generator 303b will reply to the application server 1 with the image data at the Web address as an HTML content.

Hereinafter, the addresses (URLs) having been determined in advance and exclusive for dummy data storages will be described.

In general, the specified URL to obtain Web data is indicated as http://mfp001/boxNo/filename.jpg for example, which means that the data object in jpg format with the file name "filename" stored on the box of the box number "boxNo" in the image processing apparatus "mfp001" will be returned to the application server 1.

Meanwhile, in this mode of implementation, it should be noted that the specified URL to access Web data is represented as http://mfp001/DummyData/username01/filename.jpg.

The network access analyzer 303a, which is previously mentioned, analyzes the URL according to a scheme as represented by a table in FIG. 6.

In general, the part of "http://" is the sign of the start of a Web address, and the part of "mfp100" generally is the name of a host. Here, the part of "DummyData" represents the first directory and serves as a request for dummy data, i.e. an instruction to generate dummy data.

The part of "username01", which represents the second directory here, generally is the account name of the user who created a document. The account name of the user is required to be registered in advance on the user account administrator 306 of the image processing apparatus 3. The part representing the second directory may be omitted if the users who can give an instruction to obtain dummy data do not need to be limited to those registered in advance on the user account administrator 306.

The part of "filename.jpg" is the name of a file to be generated. Instead of JPEG, another file (data) format may be specified. FIG. 7 is a table representing a scheme of a file in another file format.

The resolution should be represented as "Resolution_xxxdpi" as shown in the table of FIG. 7. The part of "xxx" is a specified dpi value of resolution. The size of the file should be represented as "Size_XXxYYmm". The parts of "XX" and "YY" are specified millimeter values of horizontal and vertical lengths of the image, respectively.

The pixel counts should be represented as "Dot_XXxYYpixels". The parts of "XX" and "YY" are specified numbers of horizontal and vertical pixels of the image.

It is also possible to specify the reading mode (scan mode) of the scanner 34. When color mode is specified, the reading mode should be represented as "Color"; when ACS (Auto Color Select) mode is specified, the reading mode should be represented as "ACS"; and when monochrome mode is specified, the reading mode should be represented as "Mono".

Figure 8:
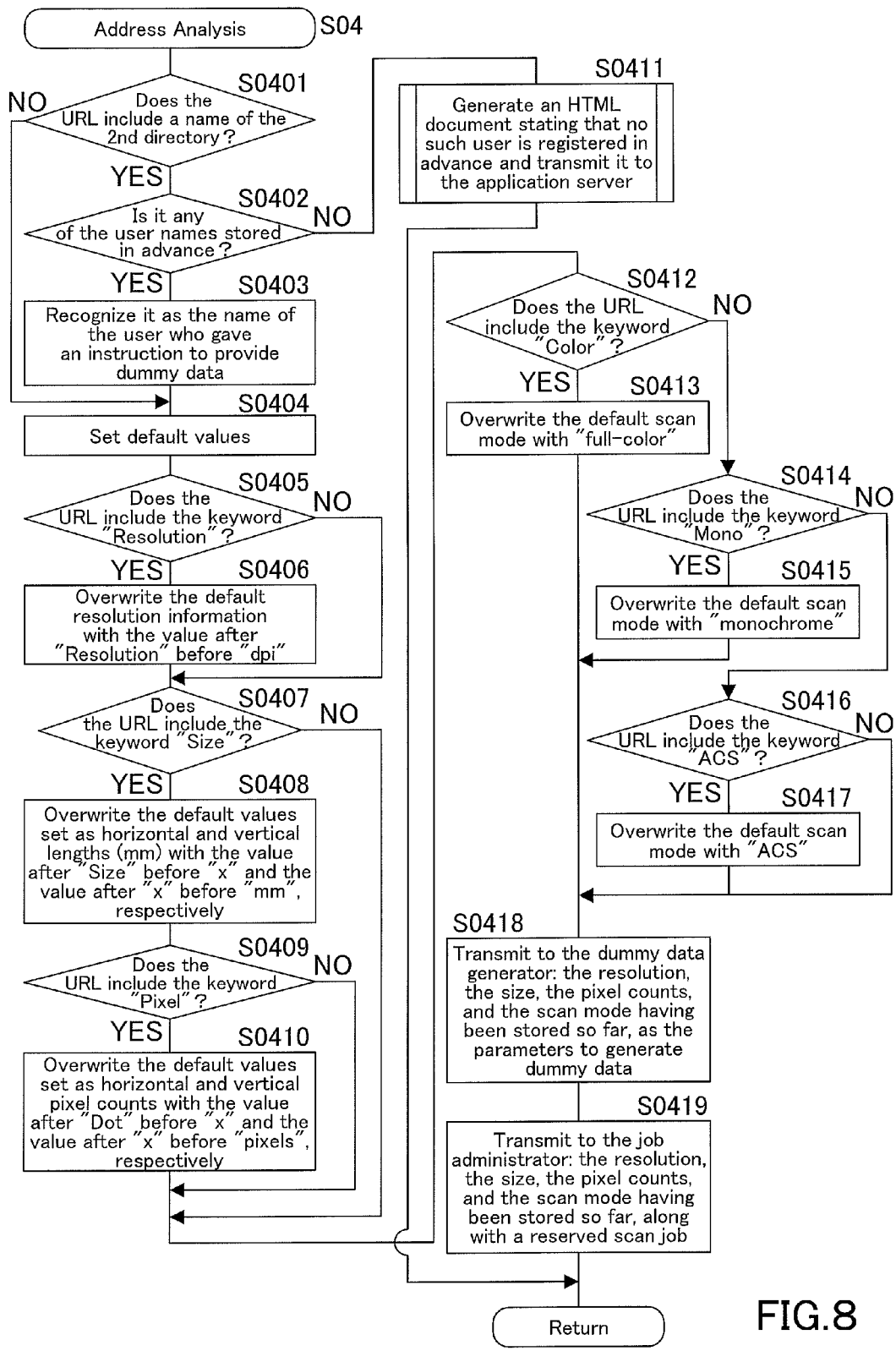
FIG. 8 is a flowchart representing a sub processing routine corresponding to the operation of address analysis (Step S04) in FIG. 5.

FIG. 8 is a flowchart representing a sub processing routine corresponding to the operation of address analysis in Step S04 of FIG. 5, which is performed according to the rules just like in the tables of FIGS. 6 and 7.

In Step S0401, it is judged whether or not the URL includes a name of the second directory. If it includes such a name (YES in Step S401), then it is judged in Step S402 whether or not it is any of those stored on the user account administrator 306. If it is any of them (YES in Step S402), it is recognized as the name of the user who would like to obtain dummy data in Step S403. Then the sub processing routine proceeds to Step S404.

If the URL does not include a name of the second directory (NO in Step S401), then the sub processing routine proceeds to Step S0404 immediately. In Step S402, if the name of the second directory is any of those stored on the user account administrator 306 (NO in Step S402), the sub processing routine proceeds to Step S0411, in which an HTML document stating that no such user is registered in advance is generated by the output data generator 303b then transmitted to the application server 1 by the network controller 38. Then the sub processing routine returns to the main processing routine.

In Step S404, default values are set for resolution, size of data, pixel counts, and scan mode, respectively.

And in Step S405, it is judged whether or not the URL includes the keyword "Resolution". If it includes that keyword (YES in Step S0405), the default value set as resolution information is overwritten with the value following the keyword "Resolution" before "dpi" in Step S0406, then the sub processing routine proceeds to Step S0407. If the URL does not include the keyword "Resolution" (NO in Step S0405), the sub processing routine proceeds to Step S0407 immediately.

In Step S407, it is judged whether or not the URL includes the keyword "Size". If it includes that keyword (YES in Step S0407), the sub processing routine proceeds to Step S0408, in which the default values set as horizontal and vertical lengths (mm) are overwritten with the value following the keyword "Size" before the character "x" and the value following the character "x" before "mm", respectively. And then the sub processing routine proceeds to Step S409. If the URL does not include the keyword "Size" (NO in Step S0407), the sub processing routine proceeds to Step S0412 immediately.

In Step S0409, it is judged whether or not the URL includes the keyword "pixel". If it includes that keyword (YES in Step S0409), the sub processing routine proceeds to Step S0410, in which the default values set as horizontal and vertical pixel counts are overwritten with the value following the keyword "Dot" before the character "x" and the value following character "x" before "pixels", respectively. And then the sub processing routine proceeds to Step S0412. If the URL does not include the keyword "pixel" (NO in Step S0409), the sub processing routine proceeds to Step S0412 immediately.

In Step S0412, it is judged whether or not the URL includes the keyword "Color". If it includes that keyword (YES in Step S0412), the default value set as a scan mode is overwritten with "full-color" in Step S0413, then the sub processing routine proceeds to Step S0418. If the URL does not include the keyword "Color", (NO in Step S0412), the sub processing routine proceeds to Step S0414 immediately.

In Step S0414, it is judged whether or not the URL includes the keyword "Mono". If it includes that keyword (YES in Step S0414), the default value set as a scan mode is overwritten with "monochrome" in Step S0415, then the sub processing routine proceeds to Step S0418. If the URL does not include the keyword "Mono", (NO in Step S0414), the sub processing routine proceeds to Step S0416 immediately.

In Step S0416, it is judged whether or not the URL includes the keyword "ACS". If it includes that keyword (YES in Step S0416), the default value set as a scan mode is overwritten with "ACS" as in Step S0417, then the sub processing routine proceeds to Step S0418. If the URL does not include the keyword "ACS" (NO in Step S0416), the sub processing routine proceeds to Step S0418 immediately.

In Step S0418, the resolution, the size, the pixel counts, and the scan mode having been stored so far are transmitted to the dummy data generator 305a as the parameters to generate dummy data. And in Step S0419, the resolution, the size, the pixel counts, and the scan mode having been stored so far are transmitted to the job administrator 304 along with a reserved scan job. At the same time, the name of the user who would like to obtain dummy data, which is recognized in Step S0403, is also transmitted to the job administrator 304. Receiving all these information objects, the job administrator 304 generates a job and stores it as a reserved scan job with connections to the name of the user. The job administrator 304 employs the received resolution, size, pixel counts, and scan mode for the reserved scan job.

In Step S0401 of the sub processing routine of FIG. 8, if the URL does not include a name of the second directory (NO in Step S0401), the sub processing routine proceeds to Step S0404 as described above, or alternatively an HTML document stating that the second directory is not found may be transmitted so as to prevent generating dummy data. In such an alternative case, dummy data will be generated as long as the name of the second directory is any of those stored on the user account administrator 306, which eliminates the inconvenience that dummy data and target data are created even for the user who is not authorized to use the image processing apparatus 3.

Figure 9:
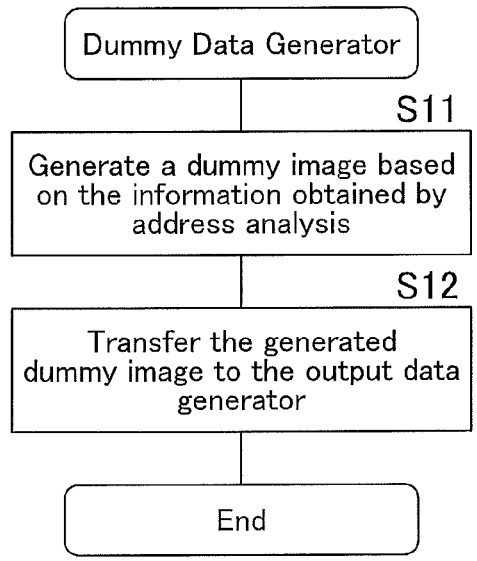
FIG. 9 is a flowchart representing an operation performed by a dummy data generator.

FIG. 9 is a flowchart representing an operation performed by the dummy data generator 305a.

In Step 11, a dummy image is generated based on the parameters obtained from Step S0418 of the sub processing routine corresponding to the operation of address analysis. And in Step S12, the generated dummy image is transmitted to the network dummy data generator 303b along with an image transfer request.

Figure 10:
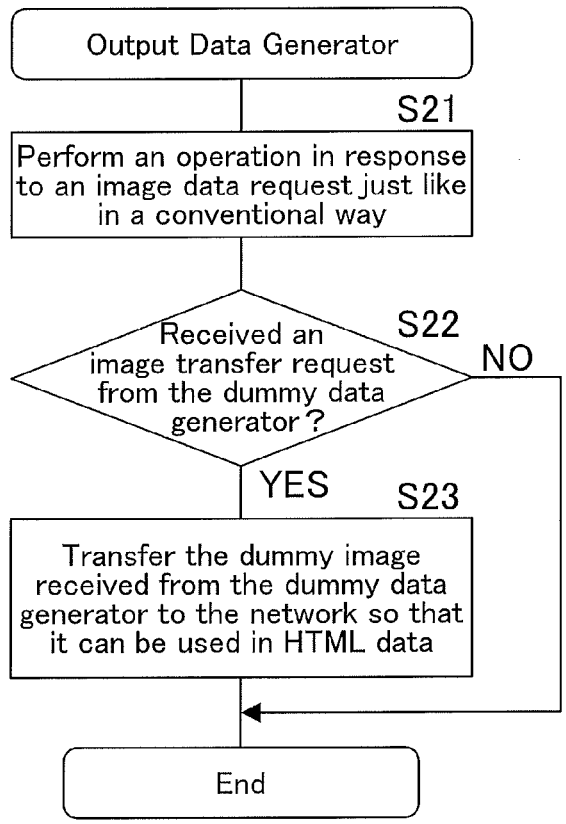
FIG. 10 is a flowchart representing an operation performed by an output data generator.

FIG. 10 is a flowchart representing an operation performed by the output data generator 303b. An operation is performed in response to an image data request just like in a conventional way in Step S21. And in Step S22, it is judged whether or not an image transfer request has been received from the dummy data generator 305a. If such a request is not received yet (NO in Step S22), the processing routine terminates. If such a request is received (YES in Step S22), the processing routine proceeds to Step S23, in which the dummy image received from the dummy data generator 305a is transferred to the network (the application server 1) via the network controller 38. In other words, the link to the specified URL from which the dummy image received from the dummy data generator 305a (the location where the dummy image is physically stored) can be obtained as HTML data, is transferred to the network. In this way, the application server 1 creates a document including a dummy image and the user is allowed to access this document by operating the user terminal 2.

FIG. 11 illustrates one example of a dummy image. As illustrated in this Figure, the dummy image demonstrates the keyword "Dummy" so that the image was created for the user to be used temporarily, and along with its own ID information, which is the size, attributes such as the resolution, the date and time the image was created, the user name, and the order the image was created. Alternatively, the dummy image may demonstrate other information, for example the information of the image processing apparatus 3 having generated the dummy image.

Figure 12:
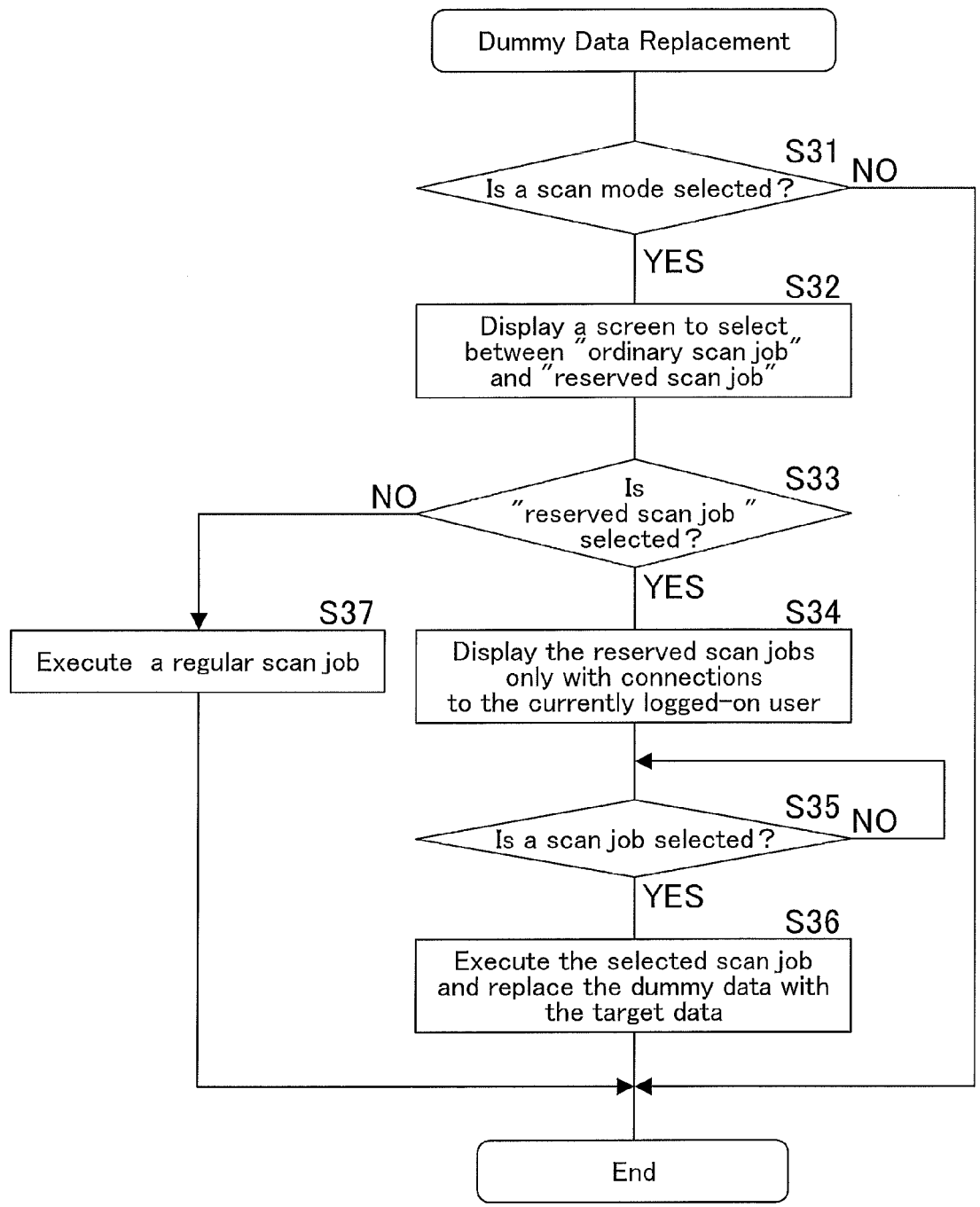
FIG. 12 is a flowchart representing the operation to replace dummy data with target data.

FIG. 12 is a flowchart representing the operation to replace dummy data with target data.

Figure 13:
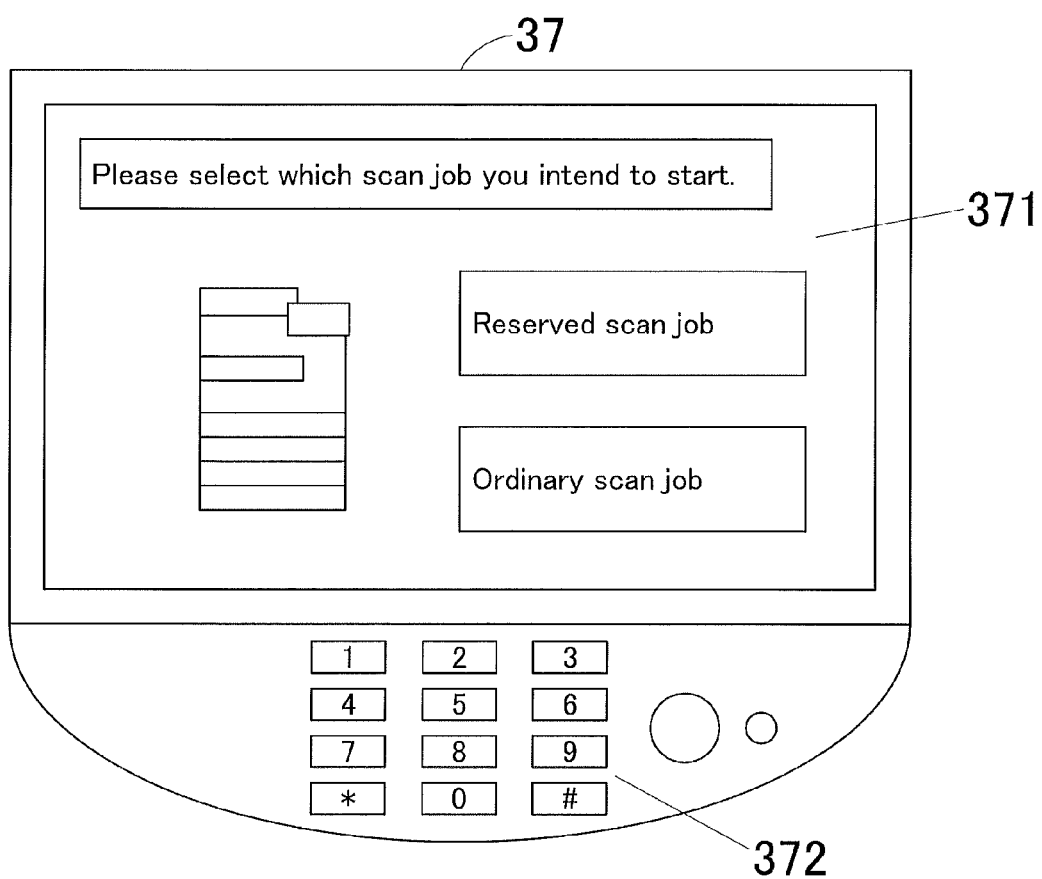
FIG. 13 is a view illustrating a screen to select between "regular scan job" and "reserved scan job"

In Step S31, it is judged by the panel controller 302 whether or not the user selected a scan mode. If the user did not select a scan mode (NO in Step S31), the processing routine terminates. If the user selected a scan mode (YES in Step S31), a screen to select either "regular scan job" or "reserved scan job" is displayed on the display 371 of the operation panel 37 in Step S32 as illustrated in FIG. 13.

And in Step S33, it is judged whether or not the user selected "reserved scan job". If the user selected "regular scan job" (NO in Step S33), the job administrator 304 executes a regular scan job in Step S37.

Figures 14, 15:
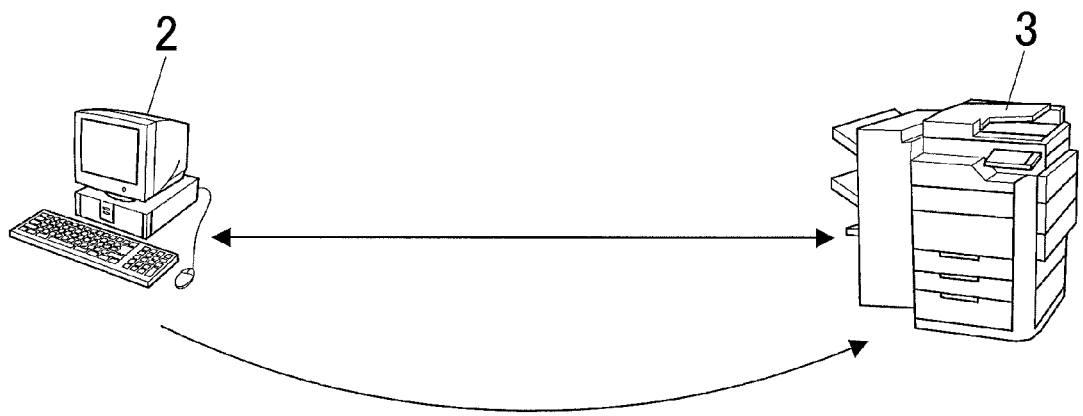
FIG. 14 is a view illustrating a list of the reserved scan jobs with connections to the user who is currently logged on the image processing apparatus.
FIG. 15 is a view illustrating a document creation system according to another mode of implementing the present invention.

If the user selected "reserved scan job" (YES in Step S33), the processing routine proceeds to Step S34, in which the job administrator 304 compares the name of the user who is currently logged on the image processing apparatus 3 to those with connections to the reserved scan jobs, and a list of the reserved scan jobs with connections to the user who is currently logged on the image processing apparatus 3 are displayed on the display 371 of the operation panel 371 as illustrated in FIG. 14.

In this way described above, the reserved scan jobs only with connections to the user who is logged on the image processing apparatus 3 are displayed on the display 371, which facilitates the user operation and prevent the user from carelessly selecting another user's reserved scan job.

In Step S35, the processing routine waits until the user selects a reserved scan job among them (NO in Step S35). If the user selected a reserved scan job among them (YES in Step S35), the processing routine proceeds to Step S36, in which the scanner 34 reads a document, the image data administrator 305 stores the obtained image data (target data) to administer, and the HTML data controller 303 publishes the target data at the Web address by replacing the dummy data with the target data.

The image processing apparatus 3 replaces dummy data at the specified URL with target data by executing this processing routine, which allows the user to obtain a document with his/her desirable image being displayed in a predetermined area. And after operating the image processing apparatus 3, the user does not have to return to the side of the user terminal 2 to put image data in a predetermined area by operating the user terminal 2, which facilitates the operation of document creation and improve its efficiency.

The mode of implementing the present invention has been described in the foregoing specification, which does not mean that the present invention shall be construed as limited to the particular forms disclosed.

For example, in this mode of implementation, the requested image data is recognized as dummy one when it is judged that the URL includes a certain name of the first directory. Alternatively, the requested image data may be recognized as dummy one when it is judged that the URL does not include such a name and no image data can be found. In other words, it is only necessary here to determine in advance a criterion for judging whether or not the requested image data is recognized as dummy one.

Although, in this mode of implementation, the document creation system is provided with the application server 1, the user terminal 2, and the image processing server 3 as illustrated in FIG. 1, the same having been described above can be applied to a document creation system according to another mode of implementation as illustrated in FIG. 15, which is provided with the user terminal 2 with a document creation application being installed thereon and the image processing apparatus 3, wherein HTTP data can be obtained via the network and inserted into a base document.

In the document creation system of FIG. 15, the user creates a base document with use of the document creation application by operating the user terminal 2 at the beginning. Subsequently, the user prepares a frame (area) in which HTTP data can be inserted, at a preferred position on a document, and specifies an address in a predetermined form which is inside of the image processing apparatus 3. Then the user terminal 2 transmits a request for dummy data to the image processing apparatus 3. That is all that the user has to do by operating the user terminal 2. After that, the same operations as in the document creation system of FIG. 1 will be performed.

Although disclosed herein is that the user specifies an address (URL) via a Web browser by operating the user terminal 2, it does not mean that the present invention shall be construed as limited to this particular form. For example, the user may create an e-mail message (document) including an address inside of the image processing apparatus 3, specified as a request for a dummy image, and transmit it to another user's user terminal 2 so that a dummy image can be generated, obtained, and replaced with a target image just like in the mode of implementation described above.

Furthermore, although disclosed herein is that the target data is image data obtained by the scanner 34, it should not be limited thereto but may be document data such as a PDF document, an e-mail message, and a facsimile document delivered into a Box.

The present invention of the subject application having been described above may be applied to the following modes.

[1] A document creation system comprising a document creation apparatus creating a document with Web-accessible data being inserted into a certain area thereof and an image processing apparatus publishing the Web-accessible data at a Web address, being connected to each other via a network, the document creation apparatus comprising a requesting portion which requests, before generation of target data, the image processing apparatus to provide dummy data to be temporarily inserted into the document as an alternative for target data, by specifying a Web address inside of the image processing apparatus, and the image processing apparatus comprising:
an address analyzer which analyzes the specified Web address to determine whether or not the request of the document creation apparatus is a request for dummy data;
a dummy data generator which generates dummy data if it is recognized as a request for dummy data by the address analyzer;

a transmitter which transmits to the document creation apparatus, the generated dummy data in a form allowing the dummy data to be temporarily inserted from the specified Web address;

a job administrator which generates and stores a reserved job about the request if it is recognized as a request for dummy data by the address analyzer;

a target data generator which generates target data to be inserted into the document by performing an operation of data generation when the user gives an instruction to start the reserved job generated and stored by the job administrator; and a replacing portion which publishes at the specified Web address the target data generated by the target data generator, by replacing the dummy data exiting at the specified Web address with it.

[2] The document creation system as recited in the aforementioned item [1], wherein the target data generator of the image processing apparatus: comprises a reader which reads an image on a document; and activates the reader to generate target data which is image data obtained by reading a document when the user gives an instruction to start a reserved job.

[3] The document creation system as recited in the aforementioned item [1], wherein the dummy data generator and target data generator of the image processing apparatus generate dummy data and target data, respectively, based on the result of analysis obtained by the address analyzer's analyzing the specified Web address according to a certain rule.

[4] The document creation system as recited in the aforementioned item [3], wherein the specified Web address includes at least one information object for dummy or target data from the size, resolution, and horizontal and vertical pixel counts, and the dummy data generator and target data generator of the image processing apparatus generate dummy data and target data, respectively, based on the information object included therein.

[5] The document creation system as recited in the aforementioned item [3], wherein the specified Web address includes information indicating an operation mode for the target data generator to generate target data, and the target data generator generates target data in the operation mode indicated by the information object.

[6] The document creation system as recited in the aforementioned item [1], wherein the address analyzer of the image processing apparatus determines that it is a request for dummy data only if the specified Web address includes the name of a specific folder.

[7] The document creation system as recited in the aforementioned item [1], wherein the dummy data generator of the image processing apparatus generates dummy data only if the specified Web address includes the information of a user who is registered as an authorized user to use the image processing apparatus.

[8] The document creation system as recited in the aforementioned item [7], wherein the job administrator of the image processing apparatus generates a reserved job and links it to the information of the registered user included in the specified Web address, and the target data generator generates target data only if the registered user is identical with the user having given an instruction to start the reserved job.

[9] The document creation system as recited in the aforementioned item [8], wherein the image processing apparatus further comprises a display, and the job administrator of the image processing apparatus allows the display to show the reserved jobs with connections to the user who is currently logged on the image processing apparatus so that the user can select among those displayed thereon.

[10] A document creation method for a document creation apparatus creating a document with Web-accessible data being inserted into a certain area thereof and an image processing apparatus publishing the Web-accessible data at a Web address, being connected to each other via a network, comprising:

the document creation apparatus's requesting, before generation of target data, the image processing apparatus to provide dummy data to be temporarily inserted into the document as an alternative for target data, by specifying a Web address inside of the image processing apparatus, and the image processing apparatus's:

analyzing the specified Web address to determine whether or not the request of the document creation apparatus is a request for dummy data;

generating dummy data if it is recognized as a request for dummy data;

transmitting to the document creation apparatus, the generated dummy data in a form allowing the dummy data to be temporarily inserted from the specified Web address;

generating and storing a reserved job about the request if it is recognized as a request for dummy data;

generating target data to be inserted into the document by performing an operation of data generation when the user gives an instruction to start the reserved job generated and stored; and publishing the generated target data at the specified Web address by replacing the dummy data existing at the specified Web address with it.

[11] An image processing apparatus comprising:

an address analyzer which analyzes a Web address inside of the image processing apparatus to determine whether or not a request of an external device, which is issued before generation of target data by specifying the Web address, is a request for dummy data to be inserted into a document as an alternative for target data;

a dummy data generator which generates dummy data to be temporarily inserted from the specified Web address if it is recognized as a request for dummy data by the address analyzer;

a transmitter which transmits to the external device, the generated dummy data in a form allowing the dummy data to be temporarily inserted from the specified Web address;

a job administrator which generates and stores a reserved job about the request if it is recognized as a request for dummy data by the address analyzer;

a target data generator which generates target data to be inserted into the document by performing an operation of data generation when the user gives an instruction to start the reserved job generated and stored by the job administrator; and a replacing portion which publishes at the specified Web address the target data generated by the target data generator, by replacing the dummy data existing at the specified Web address with it.

[12] The image processing apparatus as recited in the aforementioned item [11], wherein the target data generator: comprises a reader which reads an image on a document; and activates the reader to generate target data which is image data obtained by reading a document when the user gives an instruction to start a reserved job.

[13] The image processing apparatus as recited in the aforementioned item [12], wherein the dummy data generator and target data generator generate dummy data and target data, respectively, based on the result of analysis obtained by the address analyzer's analyzing the specified Web address according to a certain rule.

[13] The image processing apparatus as recited in the aforementioned item [13], wherein the specified Web address includes at least one information object for dummy or target data from the size, resolution, and horizontal and vertical pixel counts, and the dummy data generator and target data generator generate dummy data and target data, respectively, based on the information object included therein.

[14] The image processing apparatus as recited in the aforementioned item [13], wherein the specified Web address includes at least one information object for dummy or target data from the size, resolution, and horizontal and vertical pixel counts, and the dummy data generator and target data generator generate dummy data and target data, respectively, based on the information object included therein.

[15] The image processing apparatus as recited in the aforementioned item [13], wherein the specified Web address includes information indicating an operation mode for the target data generator to generate target data, and the target data generator generates target data in the operation mode indicated by the information object.

[16] The image processing apparatus as recited in the aforementioned item [11], wherein the address analyzer determines that it is a request for dummy data only if the specified Web address includes the name of a specific folder.

[17] The image processing apparatus as recited in the aforementioned item [11], wherein the dummy data generator generates dummy data only if the specified Web address includes the information of a user who is registered as an authorized user to use the image processing apparatus.

[18] The image processing apparatus as recited in the aforementioned item [17], wherein the job administrator generates a reserved job and links it to the information of the registered user included in the specified Web address, and the target data generator generates target data only if the registered user is identical with the user having given an instruction to start the reserved job.

[19] The image processing apparatus as recited in the aforementioned item [18], further comprising a display, wherein the job administrator allows the display to show the reserved jobs with connections to the user who is currently logged on the image processing apparatus so that the user can select among those displayed thereon.

[20] A non-transitory computer-readable recording medium with an executable document creation program being stored thereon to make a computer of an image processing apparatus execute:

analyzing a Web address inside of the image processing apparatus to determine whether or not a request of an external device, which is issued before generation of target data by specifying the Web address, is a request for dummy data to be inserted into a document as an alternative for target data;

generating dummy data to be temporarily inserted from the specified Web address if it is recognized as a request for dummy data;

transmitting to the external device, the generated dummy data in a form allowing the dummy data to be temporarily inserted from the specified Web address;

generating and storing a reserved job about the request if it is recognized as a request for dummy data;

generating target data to be inserted into the document by performing an operation of data generation when the user gives an instruction to start the reserved job generated and stored; and publishing the generated target data at the specified Web address by replacing the dummy data existing at the specified Web address with it.

With the mode of implementing the invention in the aforementioned item [1], before generation of target data, the document creation apparatus requests the image processing apparatus to provide dummy data by specifying a Web address inside of the image processing apparatus, and then the image processing apparatus analyzes the specified Web address to determine whether or not the request of the document creation apparatus is a request for dummy data. And if determining that it is a request for dummy data, the image processing apparatus generates dummy data to be inserted into a document from the specified Web address, transmits it to the document creation apparatus, and further generates and stores a reserved job about the request for dummy data. And when the user gives an instruction to start the reserved job, the image processing apparatus generates target data to be inserted into a document by performing an operation of data generation, and publishes the generated target data at the specified Web address by replacing the dummy data existing at the specified Web address with it.

In other words, the user is allowed to determine the position of an area of a document to display target data and specify a Web address so that dummy data can be inserted into the document from the specified Web address temporarily as long as target data is not generated yet. And when the user gives an instruction to start a reserved job by operating the image processing apparatus, target data is automatically inserted into the document. That facilitates the user operation: the user does not have to move here and there operating the image processing apparatus to publish target data at the specified Web address and his/her own terminal to find the target data.

With the mode of implementing the invention as recited in the aforementioned item [2], image data read out by a reader of the image processing apparatus is inserted into the document.

With the mode of implementing the invention as recited in the aforementioned item [3], dummy data and target data are generated based on the result of analysis obtained by analyzing the specified Web address according to a certain rule. In other words, the user is allowed to specify a Web address including his/her preferable size, mode, and the like so that dummy data and target data can automatically be generated based on these information objects.

With the mode of implementing the invention as recited in the aforementioned item [4], dummy data and target data are generated based on at least one information object from the size, resolution, and horizontal and vertical pixel counts included in the specified Web address.

With the mode of implementing the invention as recited in the aforementioned item [5], target data is generated in an operation mode indicated by an information object included in the specified Web address.

With the mode of implementing the invention as recited in the aforementioned item [6], it is recognized as a request for dummy data only if the specified Web address includes the name of a specific folder, which eliminates the inconvenience that dummy data and target data are created all for nothing at every access.

With the mode of implementing the invention as recited in the aforementioned item [7], dummy data is generated only if the specified Web address includes the information of a user who is registered as an authorized user to use the image processing apparatus, which eliminates the inconvenience that dummy data and target data are created even for the user who is not registered as an authorized user to use the image processing apparatus.

With the mode of implementing the invention as recited in the aforementioned item [8], a reserved job without connections to the user having given an instruction to start this reserved job is prohibited from being executed.

With the mode of implementing the invention as recited in the aforementioned item [9], the user who is currently logged on the image processing apparatus is allowed to select a reserved job in a simple manner without the risk of accidentally selecting a reserved job without connections to himself/herself.

With the mode of implementing the invention as recited in the aforementioned item [10], With the mode of implementing the present invention as recited in the aforementioned item [11], the image processing apparatus facilitates inserting data such as an image into a document, from the specified Web address.

With the mode of implementing the invention as recited in the aforementioned item [12], image data read out by a reader can be inserted into the document.

With the mode of implementing the invention as recited in the aforementioned item [13], the user is allowed to specify a Web address including his/her preferable size, mode, and the like so that dummy data and target data can automatically be generated based on these information objects.

With the mode of implementing the invention as recited in the aforementioned item [14], dummy data and target data are generated based on at least one information object from the size, resolution, and horizontal and vertical pixel counts included in the specified Web address.

With the mode of implementing the invention as recited in the aforementioned item [15], target data is generated in an operation mode indicated by an information object included in the specified Web address.

With the mode of implementing the invention as recited in the aforementioned item [16], it is recognized as a request for dummy data only if the specified Web address includes the name of a specific folder, which eliminates the inconvenience that dummy data and target data are created all for nothing at every access.

With the mode of implementing the invention as recited in the aforementioned item [17], the inconvenience that dummy data and target data are created even for the user who is not registered as an authorized user to use the image processing apparatus can be eliminated.

With the mode of implementing the invention as recited in the aforementioned item [18], a reserved job without connections to the user having given an instruction to start this reserved job can be prohibited from being executed.

With this mode of implementing the invention as recited in the aforementioned item [19], the user who is currently logged on the image processing apparatus is allowed to select a reserved job in a simple manner without the risk of accidentally selecting a reserved job without connections to himself/herself.

With the mode of implementing the present invention as recited in the aforementioned item [20], a computer of the image processing apparatus facilitates inserting data such as an image into a document, from the specified Web address.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A document creation system comprising a document creation apparatus creating a document with Web-accessible data being inserted into a certain area thereof and an image processing apparatus publishing the Web-accessible data at a Web address, the document creation apparatus and the image processing apparatus being connected to each other via a network, the document creation apparatus comprising a requesting portion which requests, before generation of target data, the image processing apparatus to provide dummy data to be temporarily inserted into the document as an alternative for target data, by specifying a Web address inside of the image processing apparatus, and the image processing apparatus comprising:

an address analyzer which uses a processor and memory to analyze the specified Web address to determine whether or not the request of the document creation apparatus is a request for dummy data;

a dummy data generator which generates dummy data if it is recognized as a request for dummy data by the address analyzer;

a transmitter which transmits to the document creation apparatus, the generated dummy data in a form allowing the dummy data to be temporarily inserted from the specified Web address;

a job administrator which generates and stores a reserved job about the request if it is recognized as a request for dummy data by the address analyzer;
a target data generator which generates target data to be inserted into the document by performing an operation of data generation when the user gives an instruction to start the reserved job generated and stored by the job administrator; and
a replacing portion which publishes at the specified Web address the target data generated by the target data generator, by replacing the dummy data existing at the specified Web address with it.

2. The document creation system as recited in claim 1, wherein the target data generator of the image processing apparatus: comprises a reader which reads an image on a document; and activates the reader to generate target data which is image data obtained by reading a document when the user gives an instruction to start a reserved job.

3. The document creation system as recited in claim 1, wherein the dummy data generator and target data generator of the image processing apparatus generate dummy data and target data, respectively, based on the result of analysis obtained by the address analyzer's analyzing the specified Web address according to a certain rule.

4. The document creation system as recited in claim 3, wherein the specified Web address includes at least one information object for dummy or target data from the size, resolution, and horizontal and vertical pixel counts, and the dummy data generator and target data generator of the image processing apparatus generate dummy data and target data, respectively, based on the information object included therein.

5. The document creation system as recited in claim 3, wherein the specified Web address includes information indicating an operation mode for the target data generator to generate target data, and the target data generator generates target data in the operation mode indicated by the information object.

6. The document creation system as recited in claim 1, wherein the address analyzer of the image processing apparatus determines that it is a request for dummy data only if the specified Web address includes the name of a specific folder.

7. The document creation system as recited in claim 1, wherein the dummy data generator of the image processing apparatus generates dummy data only if the specified Web address includes the information of a user who is registered as an authorized user to use the image processing apparatus.

8. The document creation system as recited in claim 7, wherein the job administrator of the image processing apparatus generates a reserved job and links it to the information of the registered user included in the specified Web address, and the target data generator generates target data only if the registered user is identical with the user having given an instruction to start the reserved job.

9. The document creation system as recited in claim 8, wherein the image processing apparatus further comprises a display, and the job administrator of the image processing apparatus allows the display to show the reserved jobs with connections to the user who is currently logged on the image processing apparatus so that the user can select among those displayed thereon.

10. A document creation method for a document creation apparatus creating a document with Web-accessible data being inserted into a certain area thereof and an image processing apparatus publishing the Web-accessible data at a Web address, the document creation apparatus and the image processing apparatus being connected to each other via a network, comprising:
the document creation apparatus's requesting, before generation of target data, the image processing apparatus to provide dummy data to be temporarily inserted into the document as an alternative for target data, by specifying a Web address inside of the image processing apparatus, and
the image processing apparatus's:
analyzing the specified Web address to determine whether or not the request of the document creation apparatus is a request for dummy data;
generating dummy data if it is recognized as a request for dummy data;
transmitting to the document creation apparatus, the generated dummy data in a form allowing the dummy data to be temporarily inserted from the specified Web address;
generating and storing a reserved job about the request if it is recognized as a request for dummy data;
generating target data to be inserted into the document by performing an operation of data generation when the user gives an instruction to start the reserved job generated and stored; and
publishing the generated target data at the specified Web address by replacing the dummy data existing at the specified Web address with it.

11. An image processing apparatus comprising:
an address analyzer which uses a processor and memory to analyze a Web address inside of the image processing apparatus to determine whether or not a request of an external device, which is issued before generation of target data by specifying the Web address, is a request for dummy data to be inserted into a document as an alternative for target data;
a dummy data generator which generates dummy data to be temporarily inserted from the specified Web address if it is recognized as a request for dummy data by the address analyzer;
a transmitter which transmits to the external device, the generated dummy data in a form allowing the dummy data to be temporarily inserted from the specified Web address;
a job administrator which generates and stores a reserved job about the request if it is recognized as a request for dummy data by the address analyzer;
a target data generator which generates target data to be inserted into the document by performing an operation of data generation when the user gives an instruction to start the reserved job generated and stored by the job administrator; and
a replacing portion which publishes at the specified Web address the target data generated by the target data generator, by replacing the dummy data existing at the specified Web address with it.

12. The image processing apparatus as recited in claim 11, wherein the target data generator: comprises a reader which reads an image on a document; and activates the reader to generate target data which is image data obtained by reading a document when the user gives an instruction to start a reserved job.

13. The image processing apparatus as recited in claim 11, wherein the dummy data generator and target data generator generate dummy data and target data, respectively, based on the result of analysis obtained by the address analyzer's analyzing the specified Web address according to a certain rule.

14. The image processing apparatus as recited in claim 13, wherein the specified Web address includes at least one information object for dummy or target data from the size, resolution, and horizontal and vertical pixel counts, and the dummy data generator and target data generator generate dummy data and target data, respectively, based on the information object included therein.

15. The image processing apparatus as recited in claim 13, wherein the specified Web address includes information indicating an operation mode for the target data generator to generate target data, and the target data generator generates target data in the operation mode indicated by the information object.

16. The image processing apparatus as recited in claim 11, wherein the address analyzer determines that it is a request for dummy data only if the specified Web address includes the name of a specific folder.

17. The image processing apparatus as recited in claim 11, wherein the dummy data generator generates dummy data only if the specified Web address includes the information of a user who is registered as an authorized user to use the image processing apparatus.

18. The image processing apparatus as recited in claim 17, wherein the job administrator generates a reserved job and links it to the information of the registered user included in the specified Web address, and the target data generator generates target data only if the registered user is identical with the user having given an instruction to start the reserved job.

19. The image processing apparatus as recited in claim 18, further comprising a display, wherein the job administrator allows the display to show the reserved jobs with connections to the user who is currently logged on the image processing apparatus so that the user can select among those displayed thereon.

20. A non-transitory computer-readable recording medium with an executable document creation program being stored thereon to make a computer of an image processing apparatus execute:

analyzing a Web address inside of the image processing apparatus to determine whether or not a request of an external device, which is issued before generation of target data by specifying the Web address, is a request for dummy data to be inserted into a document as an alternative for target data;

generating dummy data to be temporarily inserted from the specified Web address if it is recognized as a request for dummy data;

transmitting to the external device, the generated dummy data in a form allowing the dummy data to be temporarily inserted from the specified Web address;

generating and storing a reserved job about the request if it is recognized as a request for dummy data;

generating target data to be inserted into the document by performing an operation of data generation when the user gives an instruction to start the reserved job generated and stored; and publishing the generated target data at the specified Web address by replacing the dummy data existing at the specified Web address with it.

\* \* \* \* \*